US00RE41814E

(19) United States
(12) Reissued Patent
Owen

(10) Patent Number: US RE41,814 E
(45) Date of Reissued Patent: Oct. 12, 2010

(54) METHOD AND APPARATUS FOR PROVIDING SELECTABLE OUTPUT VOLTAGES

(75) Inventor: Donald W. Owen, Plano, TX (US)

(73) Assignee: TAPS Technology, Inc., Plano, TX (US)

(21) Appl. No.: 12/468,599

(22) Filed: May 19, 2009

Related U.S. Patent Documents

Reissue of:
(64) Patent No.: 6,734,772
Issued: May 11, 2004
Appl. No.: 09/758,866
Filed: Jan. 11, 2001

U.S. Applications:
(60) Provisional application No. 60/175,647, filed on Jan. 12, 2000.

(51) Int. Cl.
*H01F 21/12* (2006.01)

(52) U.S. Cl. ..... 336/150

(58) Field of Classification Search ..... 336/150, 336/137, 138, 148; 323/255, 258
See application file for complete search history.

(56) References Cited

U.S. PATENT DOCUMENTS 3,388,320 A * 6/1968 Schoendube et al. ..... 323/342
3,818,402 A * 6/1974 Golaski et al. ..... 336/147
4,220,911 A * 9/1980 Rosa ..... 323/343
7,463,498 B1 * 12/2008 Djekic et al. ..... 363/25

* cited by examiner

*Primary Examiner*—Shawn Riley
(74) *Attorney, Agent, or Firm*—Dillon & Yudell LLP

(57) ABSTRACT

A transformer is provided along with a combination of bridging tap-changers to provide a wide range of selectable output voltages in discrete, relatively small voltage steps where the highest voltage is more than double the lowest output voltage. Relatively inexpensive, off-the-shelf, bridging tap-changers are utilized in conjunction with transformer winding schemes to provide a low winding loss ratio.

35 Claims, 10 Drawing Sheets

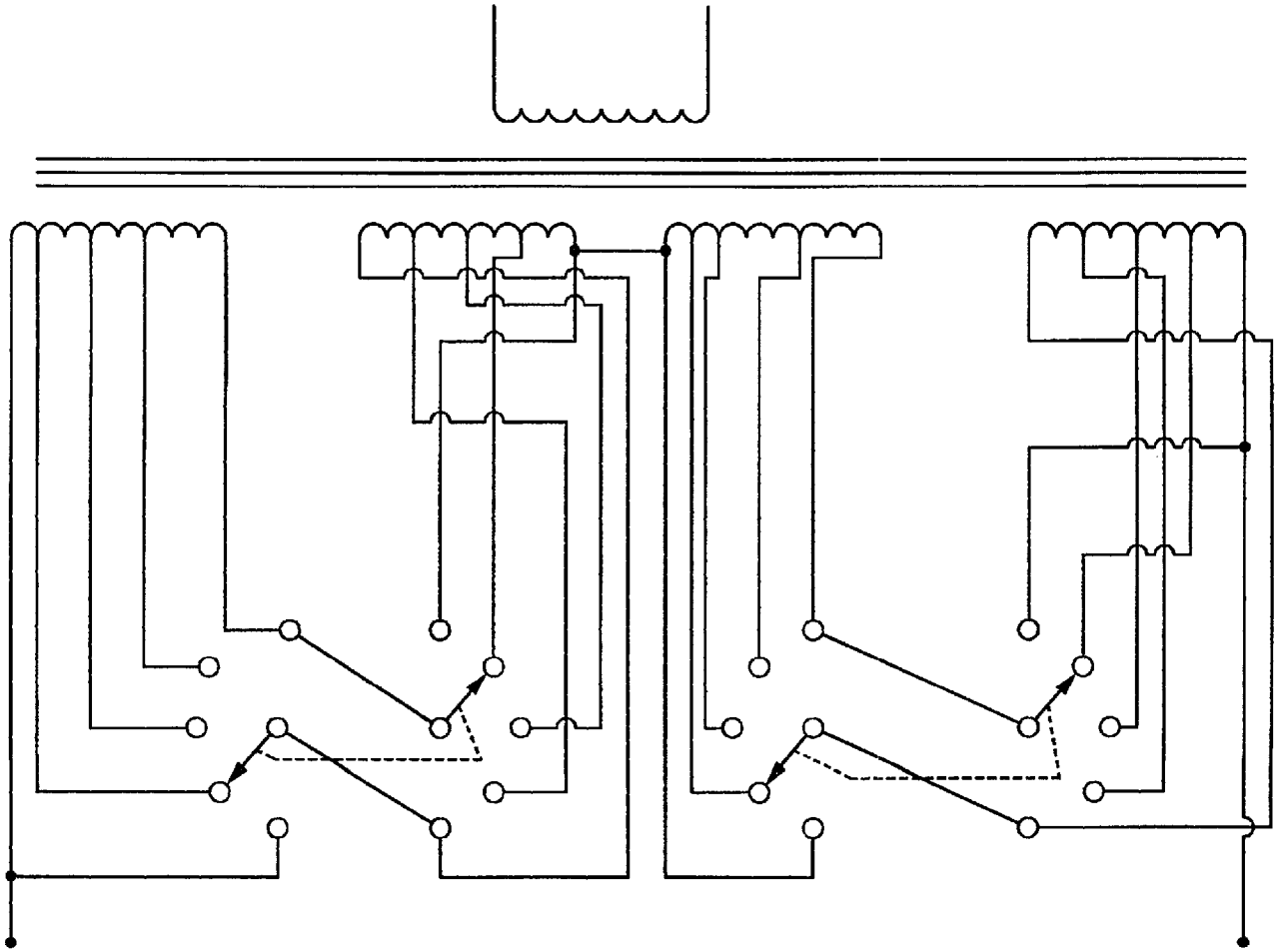
*Fig. 3*
*(Amended)*

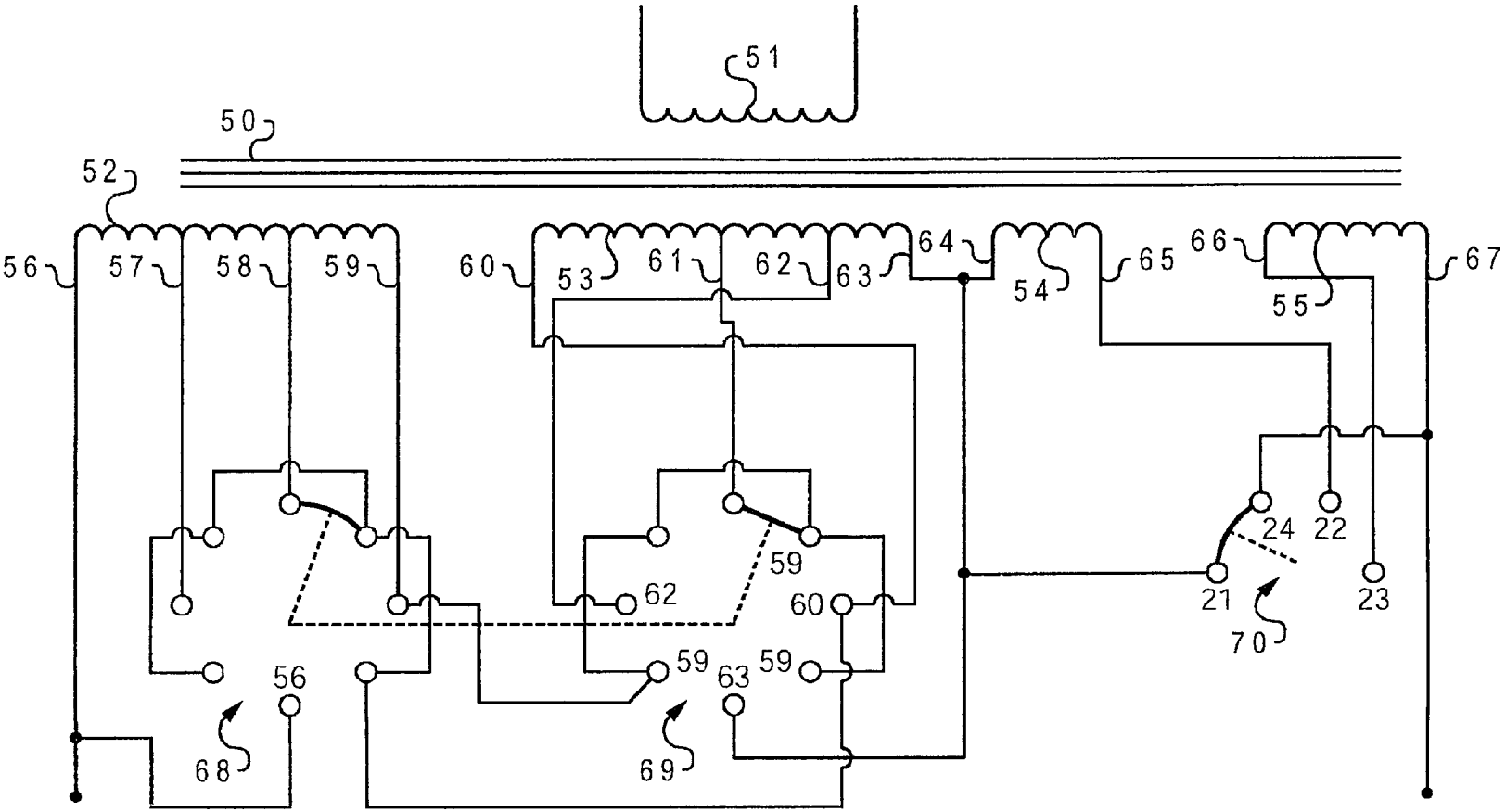
*Fig. 7*
*(Amended)*

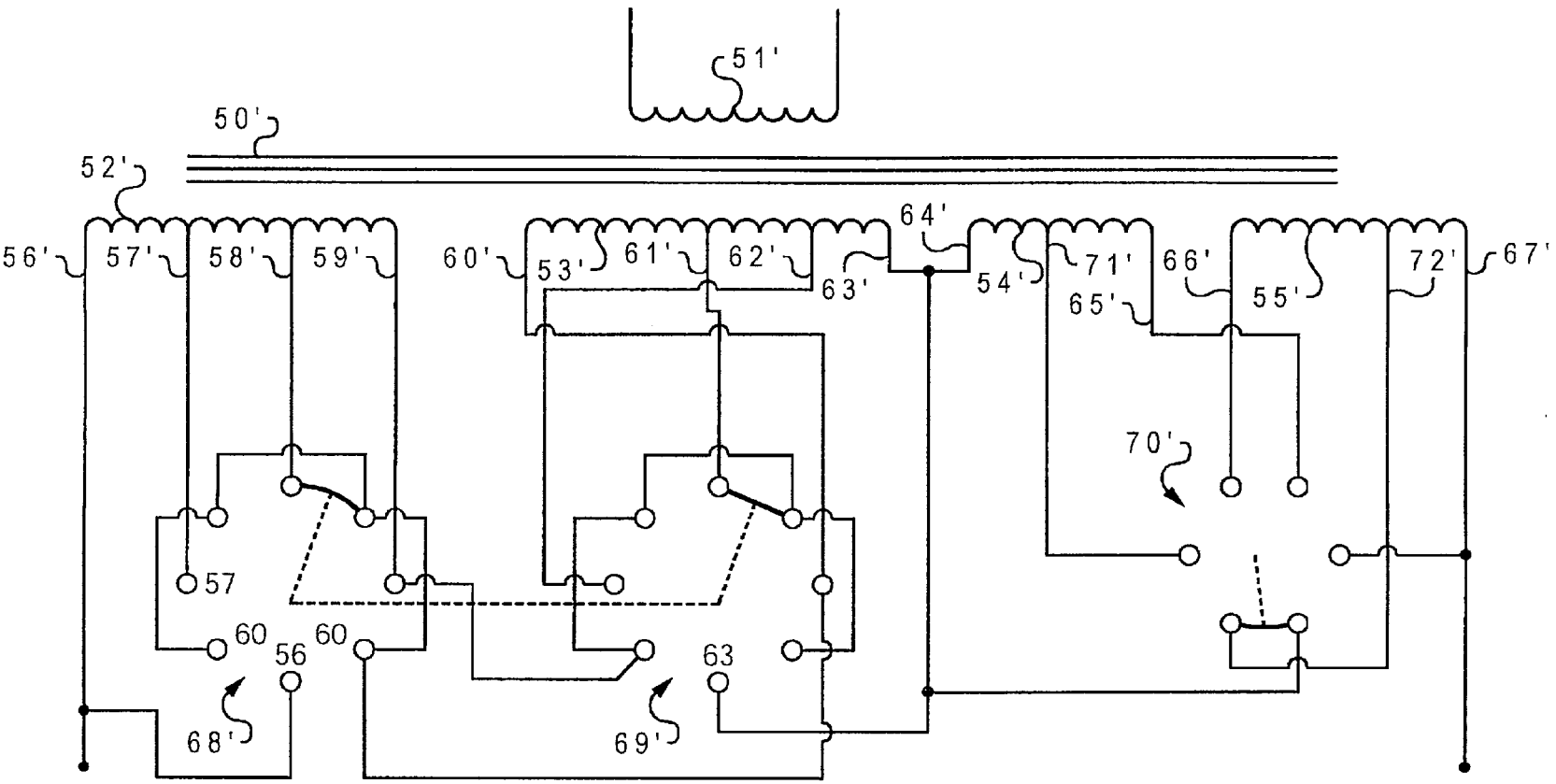
*Fig. 8*
*(Amended)*

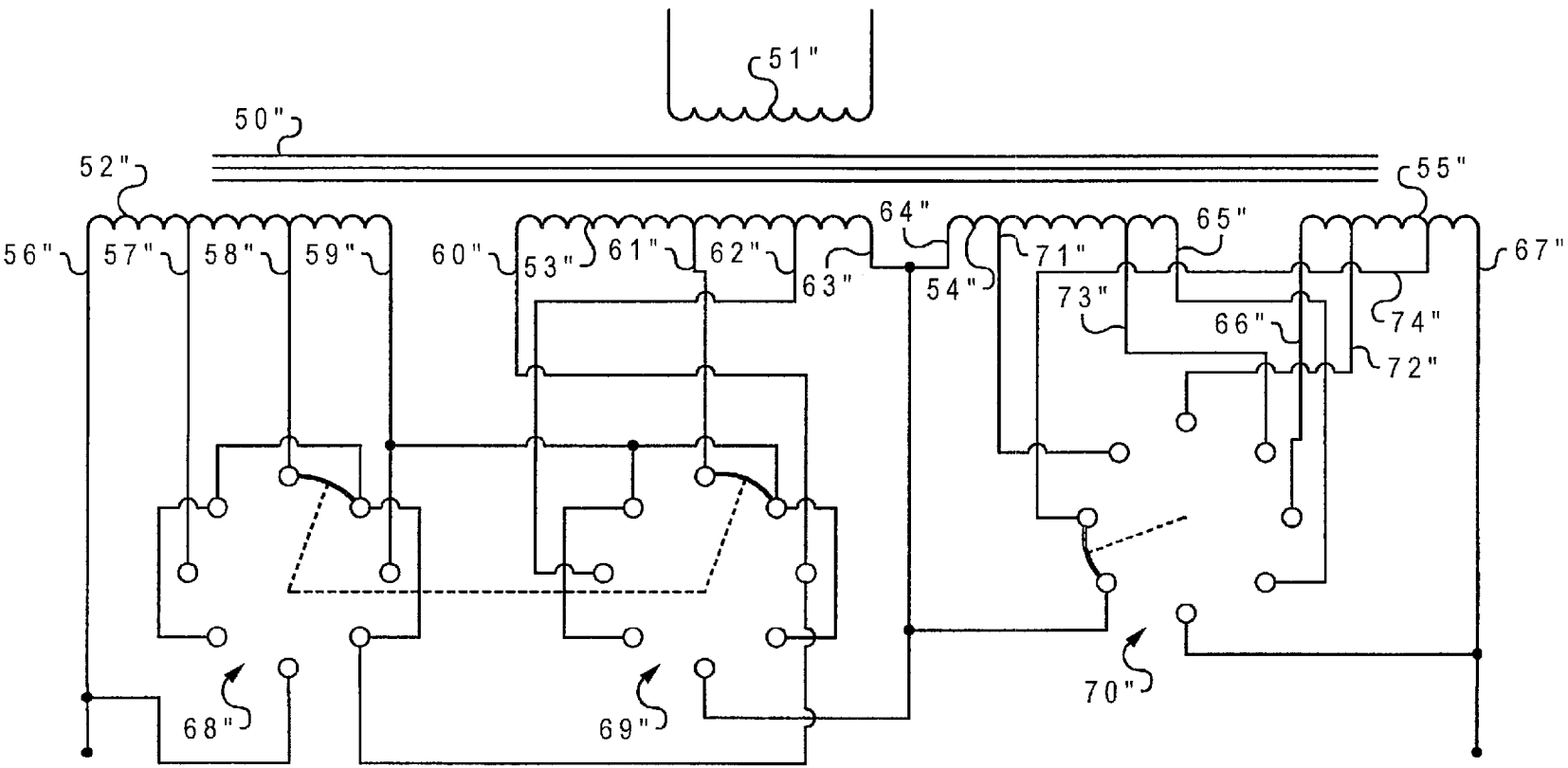
*Fig. 9*
*(Amended)*

METHOD AND APPARATUS FOR PROVIDING SELECTABLE OUTPUT VOLTAGES

Matter enclosed in heavy brackets [ ] appears in the original patent but forms no part of this reissue specification; matter printed in italics indicates the additions made by reissue.

The present invention claims the benefit of the filing date of provisional application, U.S. Serial No. 60/175,647, filed on Jan. 12, 2000.

BACKGROUND OF THE INVENTION

1. Field of the Invention

The present invention relates to electrical power distribution equipment and more particularly to electrical transformers and switching means therefor.

2. Description of the Prior Art

In some electrical power distribution systems it is desirable to provide a plurality of selectable, often incrementally different, voltage outputs from system transformers. A range of such selectable voltage outputs from a single transformer may be achieved through the use of transformers having a number of isolated multiple tap primary and/or secondary windings interconnected to appropriate switching mechanisms. Commonly used in such applications are bridging tap changers and series-parallel-series (S-P-S) switches.

Bridging tap changers may take the form of several stationary electrical contacts arranged in an arcuate array with a movable contact mounted on an insulating rotor. Rotation of the rotor brings the movable contact into bridging contact with any selected pair of adjacent stationary contacts. Bridging tap changers may be connected to provide selectable voltage outputs by interconnecting the ends and/or taps of transformer windings so as to bypass any or all selected portions (turn groups) of windings.

Two-position series-parallel (S-P) switches and multiple position S-P-S switches are used to connect multiple transformer windings, some of which may be tapped, into various series-parallel-series configurations as well as full series or full parallel configurations. S-P and S-P-S switches characteristically are ganged switch pairs where each switch of each pair has a common terminal.

Bridging tap changers having six stationary contacts (five positions) or eight stationary contacts (seven positions) are the most commonly used in the industry. For this reason, five and seven-position bridging tap changers are easily obtainable as "off-the-shelf" items and are relatively inexpensive. Bridging tap changers with a greater number of positions are usually made to order and therefore are more expensive and have longer delivery times.

It is at times expedient to interconnect bridging tap changers in a manner to provide a common terminal. Such a configuration is achieved in the prior art by "jumper wiring" every other stationary contact of a bridging tap changer in common. Thus, the rotary contact becomes, in effect, the common terminal since in every position of the changer it is in contact with one of the "jumped" stationary contacts. When so wired, a five-position bridging tap changer becomes, in effect, a three-position device and a seven-position bridging tap changer becomes a four-position device, each with a common terminal.

In constructing tap changing selectable output transformers it is desirable to provide a wide range of output voltages available in discrete, relatively small voltage steps. Among the design factors to be considered are cost and ready availability of material or parts, such as switches. Also to be considered, are the winding losses and in particular the winding losses of the highest loss configuration relative to the losses of the lowest loss configuration.

SUMMARY OF THE INVENTION

It is therefore one object of the present invention to provide a method and apparatus that will provide output voltages in small increments between the highest and lowest output voltage in multiple-tap power transformers.

It is another object of the present invention to provide a method and apparatus that will provide a wide range of output voltages in multiple tap power transformers where the highest voltage output is greater than twice the lowest voltage output and the winding loss factor is low.

The foregoing objects are achieved as is now described. In the illustrated embodiments of the present invention, there are provided a series of switched, multiple tap power transformers offering a wide range of selectable output voltages in discrete, relatively small voltage steps wherein the highest voltage is more than double the lowest output voltage. Further, the highest to lowest loss ratio is less than most comparable prior art systems. The present invention uses "off-the-shelf," relatively inexpensive, and readily available switches in conjunction with less elaborate and thus less expensive transformer winding schemes than comparable prior art systems.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 1, 2 and 3 depict schematic diagrams of prior art multi-tap transformer switching configurations;

FIG. 7 depicts a fourth variant of a transformer switch in accordance with a preferred embodiment of the present invention;

FIG. 8 illustrates a fifth variant of a transformer switch in accordance with a preferred embodiment of the present invention;

FIG. 9 depicts a sixth variant of a transformer switch in accordance with a preferred embodiment of the present invention.

DETAILED DESCRIPTION OF THE INVENTION

Figure 1:
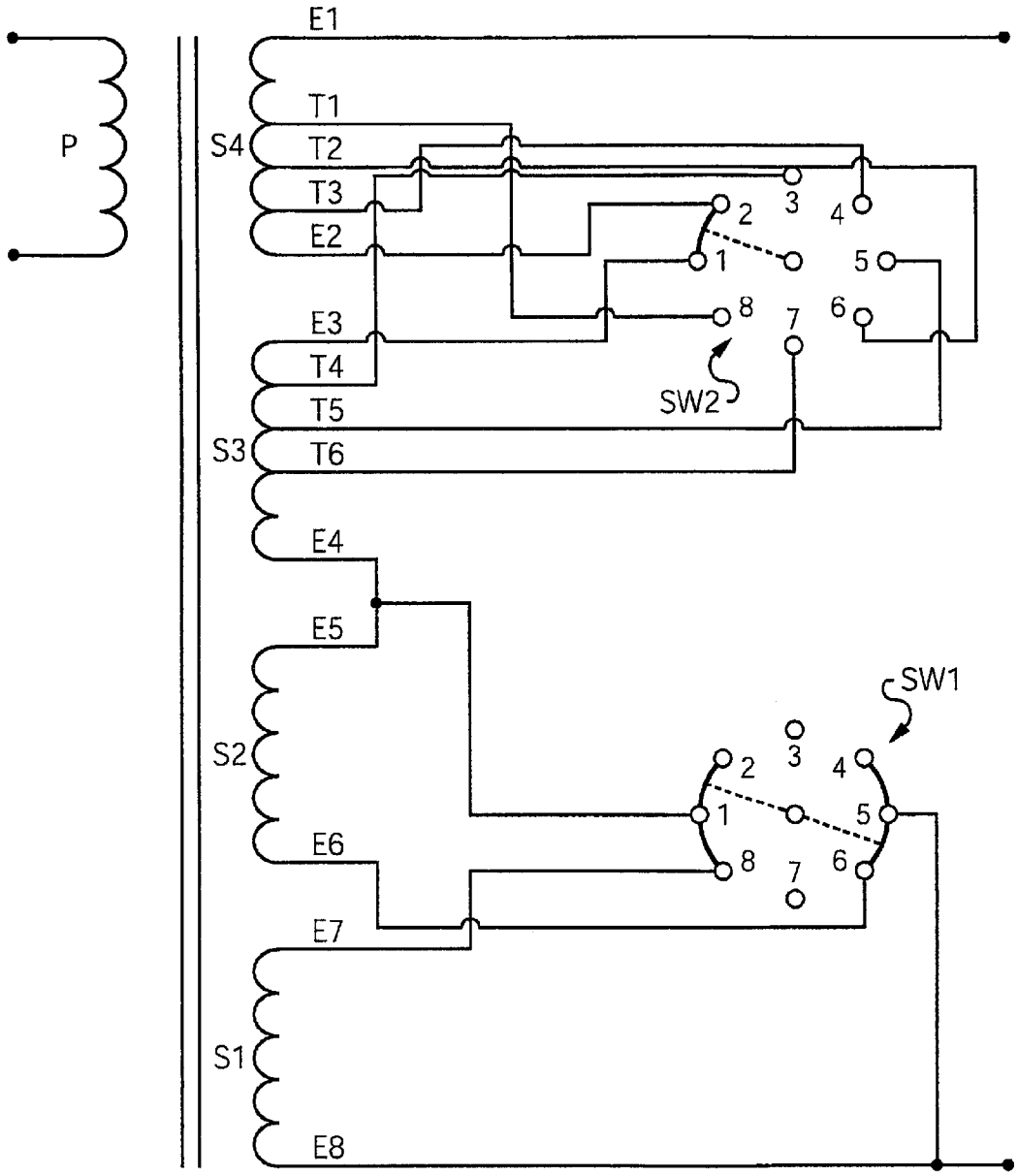

Referring to FIG. 1, there is shown in schematic diagram form a single phase power transformer having a single untapped primary winding P (primary), a pair of isolated individual untapped secondary windings (secondary), S1 and S2, and a pair of isolated individual tapped secondary windings, S3 and S4. Windings S1 and S2 are interconnected by a two-position series parallel switch (non-bridging type) SW1, and windings S3 and S4 are interconnected by a seven-position bridging tap changer switch SW2. The S1, S2 and SW1 system is serially connected to the S3, S4 and SW2 system as shown.

In the prior art arrangement shown in FIG. 1, the secondary winding turns ratio between the taps of S3 and S4 are equal to one unit each, the turns ratio between the winding ends of S3 and S4 are equal to six units each, and the turns ratio between the winding ends of S1 and S2 are equal to seven units. The system of FIG. 1 can provide fourteen different voltage outputs from thirteen units to twenty-six units of voltage in steps of one voltage unit each.

A design such as that of FIG. 1 has the advantage of using lower cost, off-the-shelf switches but this design exhibits relatively high losses at the lower voltage outputs and relatively large voltage increments.

The secondary winding losses asserted herein are calculated using the following assumptions: constant power frequency, constant applied sinusoidal voltage, constant kVA load, equal resistance in each turn and equal impedance in each turn. Core loss, primary winding loss, lead loss, stray loss and eddy current loss are ignored. The relative value of the various tapping schemes are thus compared on a consistent basis.

Figure 2:
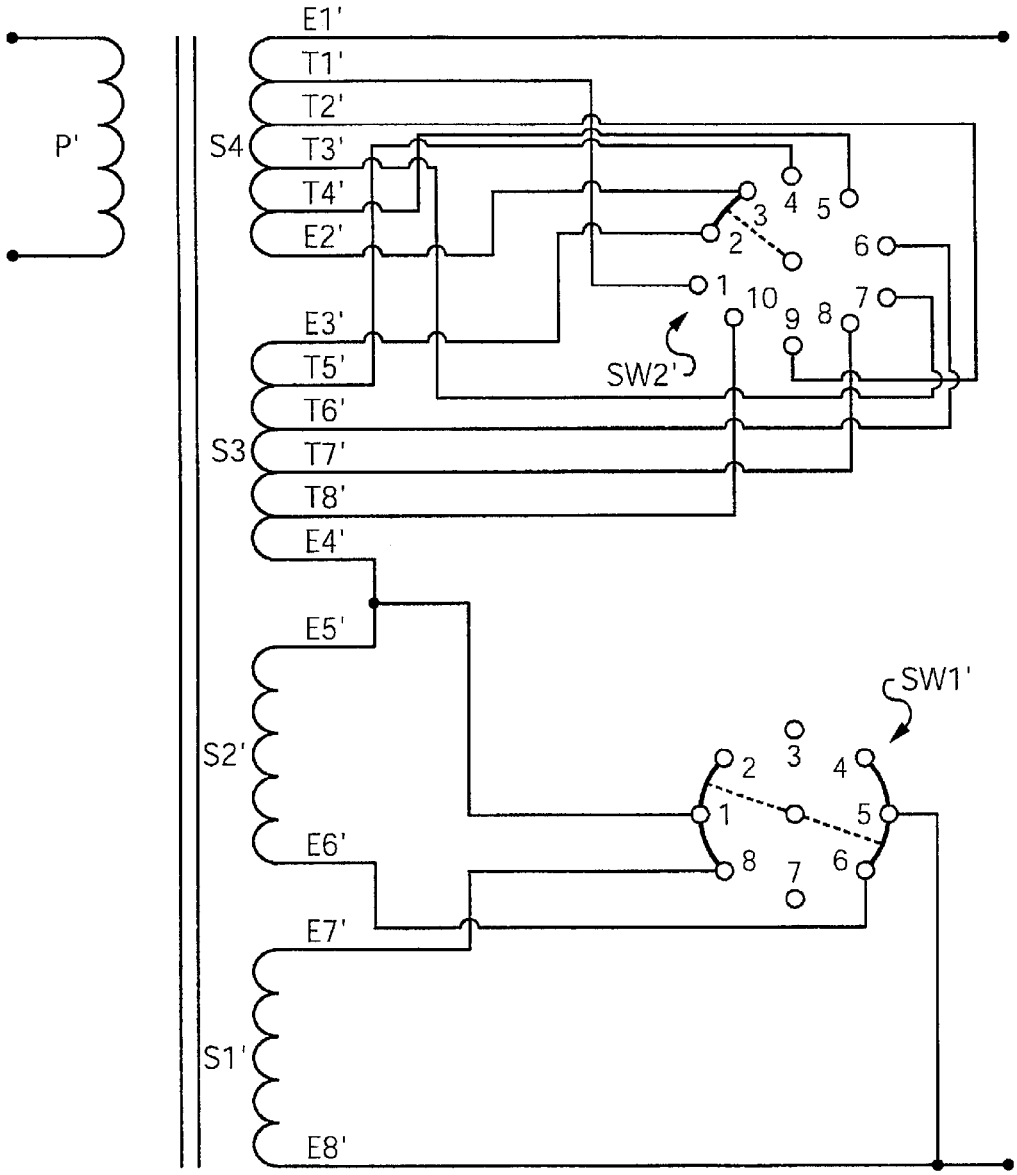

The prior art shown schematically in FIG. 2 is similar to that of FIG. 1. The system of FIG. 2 can provide eighteen different voltage outputs from seventeen to thirty-four voltage units in steps of one voltage unit each. The system of FIG. 2 requires turns ratios as follows: one unit between adjacent taps T1' through T4' and between T4' and winding end E2'; one unit between adjacent taps T5' through T8' and between tap T5' and winding end E3'; eight units between winding ends E1' and E2' and between E3' and E4'; and nine units between E5' and E6' and nine units between E7' and E8'. The FIG. 2 system uses a more expensive switch SW2' as well as other materials of comparable cost to those in the system of FIG. 1.

Prior art systems similar to that shown in FIG. 3 have allowed a relatively large number of voltage steps, twenty-five for the system shown. But such a system requires special (more expensive) switches, such as the five-position series-parallel-series switch shown, and are limited to a reduced voltage range with the highest voltage available being no more than twice the lowest voltage. Alternatively, special ganged, nine position, bridging tap changers "jumper wired" for five positions may be substituted.

The present invention combines three, five, and/or seven-position tap changers, which are off the shelf, relatively inexpensive switches and are readily available with unique but inexpensive tapped winding transformers.

Figure 4:
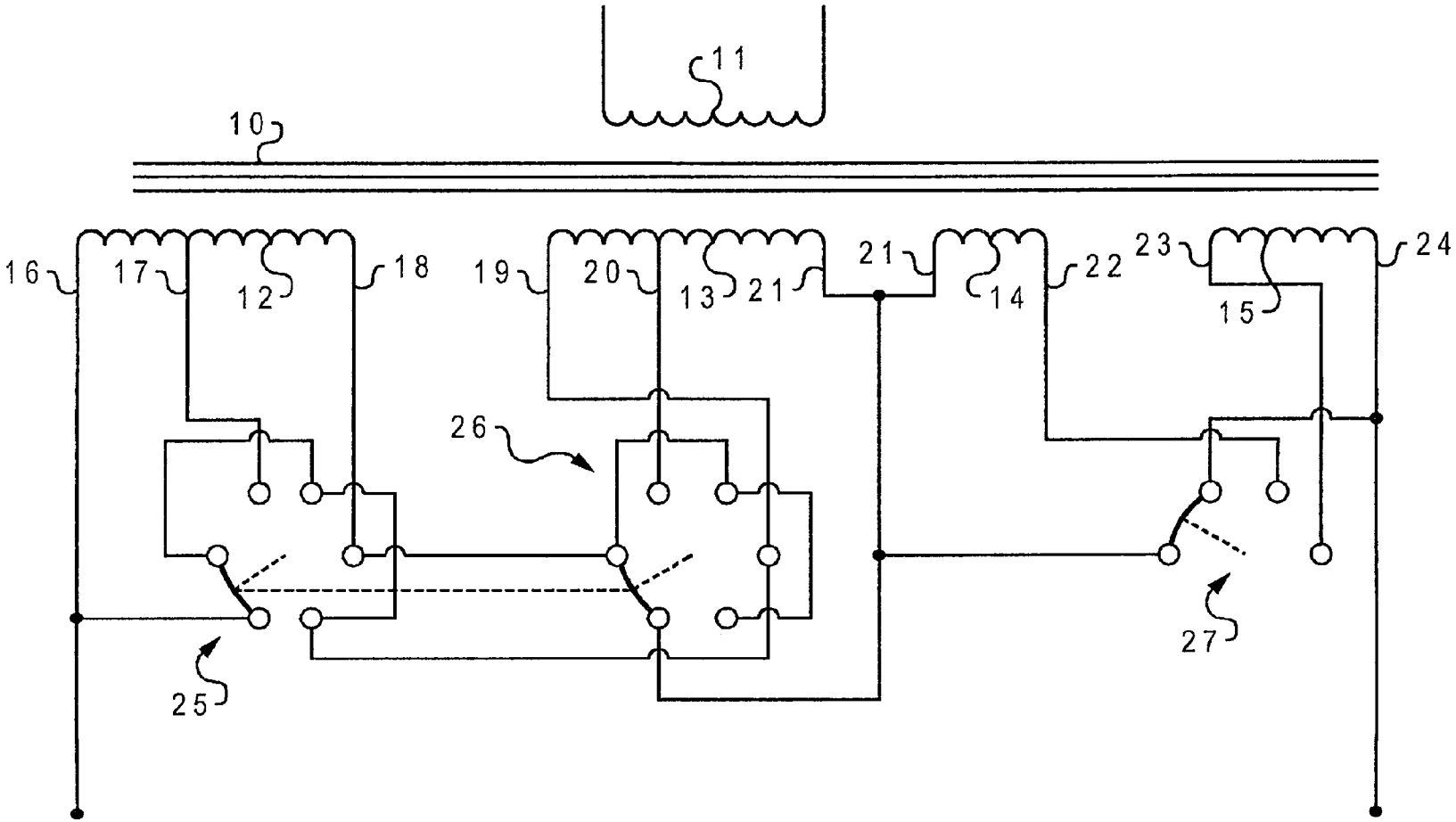
FIG. 4 is a schematic diagram of a transformer switch in which a preferred embodiment of the present invention may be implemented.

In the first embodiment of the present invention, shown in FIG. 4 of the drawings, the schematically illustrated transformer 10 has a primary winding 11, two isolated center tapped secondary windings 12 and 13 and two additional isolated secondary windings 14 and 15. Electrical access leads 16 through 24 provide electrical contact to the winding ends and taps as shown. The turns ratios of the secondary windings are 6:6:1:1 for windings 12, 13, 14, and 15, respectively.

Leads 16 through 21 are interconnected through a pair of ganged five-position bridging tap changers 25 and 26 and wired as a three-position series-parallel-series switch. Leads 21 through 24 are interconnected through a three-position bridging tap changer 27. Both three-position and five-position bridging tap changers are relatively inexpensive, off-the-shelf switches.

According to the invention, the system of FIG. 4 provides a selection of any of nine distinct voltage outputs at transformer secondary output terminals 28 and 29 in one voltage unit steps from six voltage units to fourteen voltage units. The ratio of maximum to minimum secondary winding losses in the system of FIG. 4 is 1.296. The prior art systems of FIG. 1 and FIG. 2 can be adapted to achieve similar voltage range but the loss ratios are significantly higher, 1.496 and 1.510 respectively. The prior art of FIG. 3 cannot be adapted to this voltage range.

Figure 5:
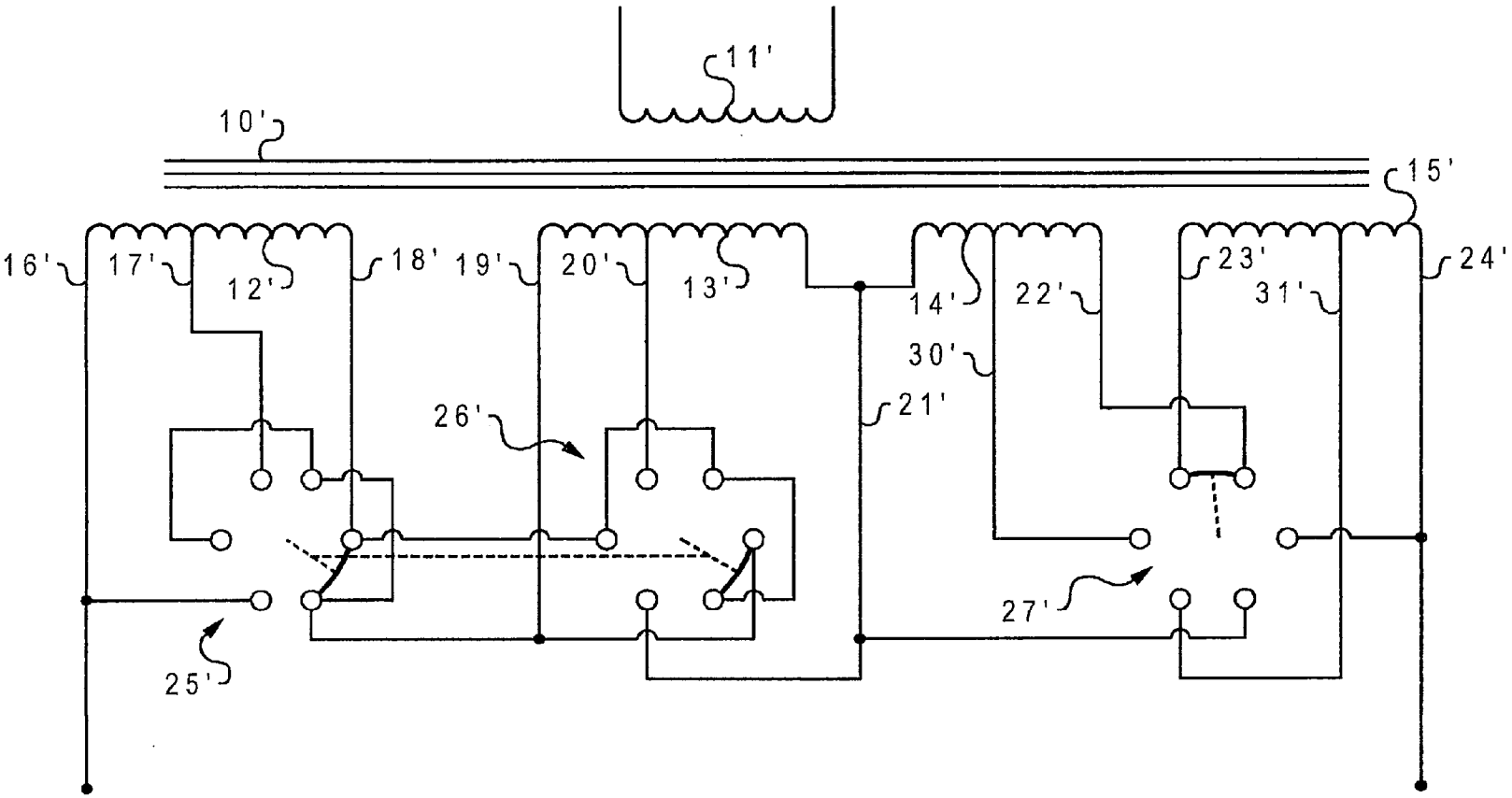
FIG. 5 depicts a second variant of a transformer switch in accordance with a preferred embodiment of the present invention.

FIG. 5 illustrates, schematically a system similar to that of FIG. 4 in that transformer 10' has a pair of isolated center tapped windings 12' and 13' interconnected by a pair of ganged five-position bridging tap changers 25' and 26'. Transformer 10' differs from transformer 10 in having a pair of isolated secondary windings 14' and 15' that are each center tapped and a turns ratio of 10:10:2:2 in the windings 12', 13', 14' and 15'. The interconnection of windings 14' and 15' is through a five-position bridging tap changer 27', as shown. The system of FIG. 5 provides fifteen different voltages available at one unit increments from ten to twenty-four voltage units. The secondary winding ratio, highest to lowest, is 1.333. The prior art systems of FIG. 1 and FIG. 2 can be adapted to achieve similar voltage range but the loss ratio is significantly higher, 1.495 and 1.511 respectively. The prior art of FIG. 3 cannot be adapted to this voltage range.

Figure 6:
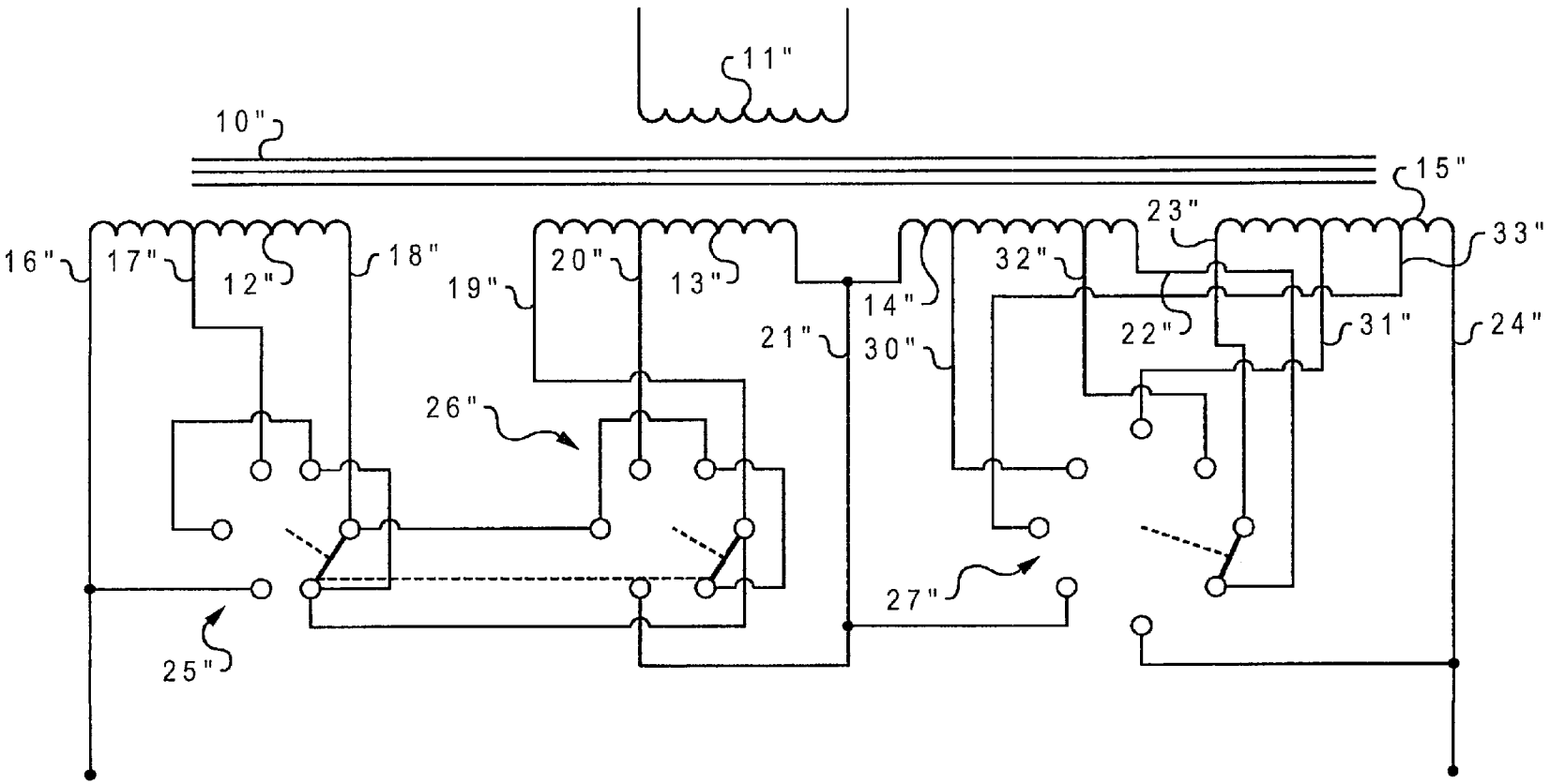
FIG. 6 illustrates a third variant of a transformer switch in accordance with a preferred embodiment of the present invention.

In the transformer system schematically depicted in FIG. 6, twenty-one different voltage outputs are provided in one unit steps from fourteen to thirty-four voltage units. The ratio of highest to lowest winding loss is 1.349. The loss ratios of similar voltage range using the systems of FIG. 1 and FIG. 2 are 1.491 and 1.511 respectively. The prior art of FIG. 3 cannot be adapted to this voltage range. The system of FIG. 6 comprises a transformer 10" with an isolated pair of center tap secondary windings 12" and 13" interconnected by switches 25" and 26" wired as a three-position series-parallel-series switch and a pair of secondary windings 14" and 15" each having winding taps 30", 31", 32" and 33", respectively, dividing the windings into thirds. Secondary windings 14" and 15" are interconnected through a seven-position bridging tap changer 27", as shown.

Referring to FIG. 7 the transformer 50 comprises a primary winding 51 and four isolated secondary windings, two of which, 52 and 53, are tapped at thirds and two of which, 54 and 55, have no taps. Windings 52 and 53 have their end leads 56 and 59 and 60 and 63 and tap leads 57 and 58 and 61 and 62 interconnected, as shown by a pair of ganged seven-position bridging tap changers 68 and 69 connected as four-position series-parallel-series switches. End leads 64, 65, 66 and 67 of secondary windings 54 and 55, respectively, are interconnected, as shown, by a three-position bridging tap changer 70.

In the system of FIG. 7, windings 54 and 55 each comprise a one unit turns group and windings 52 and 53 each comprise a nine unit turns group (three units per tapped section). The transformer system of FIG. 7 then provides twelve unique voltage outputs in one unit steps from nine voltage units to twenty voltage units having a highest to lowest ratio of winding losses of 1.250. The winding losses of FIG. 1 and FIG. 2 adapted for comparable voltage range are 1.491 and 1.503 respectively. The prior art of FIG. 3 cannot be adapted to this voltage range.

In the embodiment schematically illustrated in FIG. 8, the secondary windings 54' and 55' are center tapped with their leads 64', 65', 66' and 67' and their tap leads 71' and 72' interconnected by a five-position tap changer 70'. Secondary windings 52' and 53' are each tapped at thirds similar to windings 52 and 53 of FIG. 7 but are differently related to the secondary windings 54' and 55'. Specifically, windings 54' and 55' each comprise a two unit turns group and windings 52' and 53' each comprise a fifteen unit turns group (i.e., five units per tapped section).

The system of FIG. 8 thus provides twenty unique voltage outputs in one unit steps from fifteen voltage units to thirty-four voltage units with the highest to lowest winding loss ratio of 1.275. The winding losses of FIG. 1 and FIG. 2 adapted for a comparable voltage range are 1.494 and 1.507 respectively. The prior art of FIG. 3 cannot be adapted to this voltage range.

In the sixth embodiment of the present invention shown in FIG. 9, the secondary windings 52" and 53" are, as in the previous two embodiments, tapped at thirds as are secondary windings 54" and 55". The turns ratio relationship between the four secondary windings of the system of FIG. 8 is such that windings 54" and 55" each comprise a three unit turns group and windings 52" and 53" each comprise a twenty-one unit turns group.

With the leads of windings 52" and 53" connected by series-parallel-series switch, ganged switches 68" and 69", as in the previous embodiments, and the leads of windings 54" and 55" are interconnected through a seven-position bridging switch 70", as shown, the system of FIG. 9 provides twenty-eight different voltage outputs available in one voltage unit steps from twenty-one to forty-eight voltage units. The highest to lowest winding loss ratio of the system of FIG. 9 is 1.286. The highest to lowest loss ratios of FIG. 1 and FIG. 2 adapted to this voltage range are 1.495 and 1.508 respectively. The prior art of FIG. 3 cannot be adapted to this voltage range.

It will be apparent to those familiar with the art that the fixed connection between terminal 63" of winding 53" and terminal 70" of winding 54" can be a internal coil connection as well as an external connection. An internal connection essentially makes winding 53" and 54" one continuous winding. This alternative construction may be adapted to any of the embodiments depicted in FIGS. 4, 5, 6, 7, 8 and 9.

Figure 10:
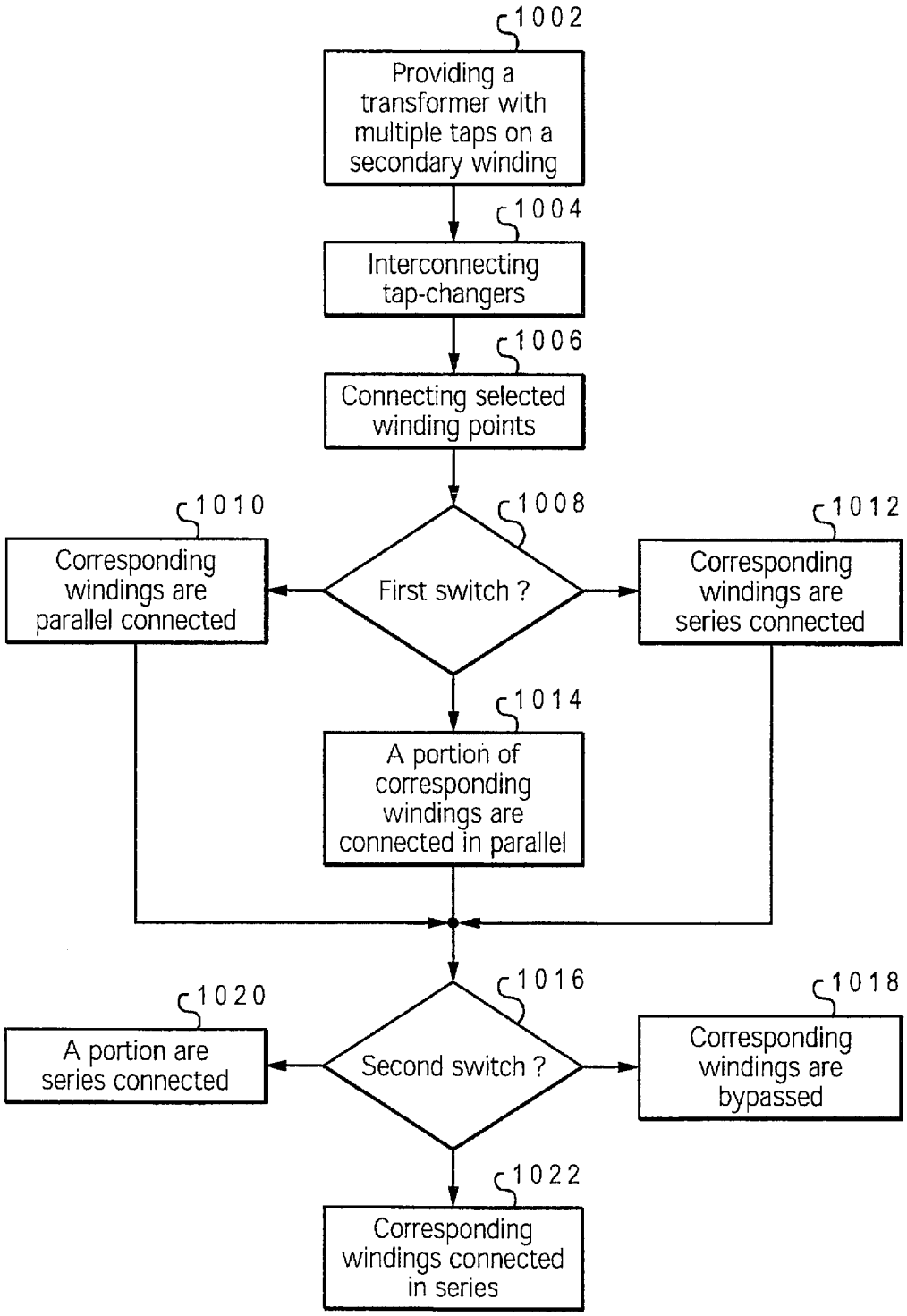
FIG. 10 illustrates a high-level flow diagram of a method for providing output voltages in accordance with a preferred embodiment of the present invention.

Referring now to FIG. 10, a flow diagram is depicted of a method for providing selectable voltage outputs in accordance with the present invention. The process begins with step 1002, which depicts providing a transformer (single phase, two phase, or three phase) with multiple taps on a secondary winding (secondary). The process continues with step 1004, which illustrates providing interconnecting bridging tap-changers: a two stage, ganged bridging tap-changer in a series-parallel-series configuration and a single stage bridging tap-changer to the secondary of the transformer for providing incremental output voltages.

The process then proceeds to step 1006, which depicts connecting selected winding points on the secondary winding with selected contacts on the two stage, ganged bridging tap-changers. The process next passes to step 1008, which depicts connecting windings via various switch positions of the two stage bridging tap-changer and single stage bridging tap-changer combination. If the switch is moved to a first position, the process proceeds to step 1010, which illustrates corresponding windings being connected in parallel. The process continues to step 1016. If the switch is moved to a second switch position, the process passes to step 1012, which depicts connecting corresponding windings being connected in series. The process then continues to step 1016. If the switch is moved to any other position, the process instead passes to step 1014, which illustrates connecting a portion of the corresponding windings in parallel and in addition, a portion of the windings in series.

Corresponding windings include those winding turns from one selected winding tap to another selected winding tap, and all the windings in between, physically connected to a particular switch, including a ganged switch. With reference to the figures, a corresponding winding includes a pair of taps from a winding with one end having a polarity opposite that of the other end and including all the taps between the pair.

The process continues from step 1014, step 1012 or step 1010 to step 1016, which depicts a single stage bridging tap-changer interconnected to the first switch. If the second switch is moved into a first switch position, the process passes to step 1018, which illustrates corresponding windings being fully bypassed. If the tap-changer is in a second switch position, the process moves to step 1020, which depicts the corresponding windings being connected in series. If the tap changer is in any other position, the process passes to step 1022, which illustrates a portion of the corresponding windings being series connected.

The present invention achieves voltage steps of ¼sth of a fully series connected winding utilizing off the shelf seven position bridging tap-changers. The prior art of FIG. 3 can achieve voltage steps of ¼sth of a fully series connected winding, but only with the use of a specially designed switches, but cannot achieve the voltage range of the present invention. The present invention achieves a voltage range from a lowest voltage up to 2.286 times the lowest voltage. Though the prior art FIGS. 1 and 2 can achieve the wider voltage range of the present invention a significantly higher loss factor is incurred. The present invention has a winding loss ratio, highest to lowest, of 1.286.

While the designations "primary" or "input" and "secondary" or "output" windings have been used herein, arbitrarily, to designate various windings of the embodiments disclosed, it is well recognized by those skilled in the art that the switches and tapped winding arrangements may be used in the primary or input windings and the other windings used as secondary or output windings. It will be recognized as well that any of the systems of the present invention may be used in multiples on polyphase electrical systems.

Thus, there has been disclosed a new transformer topology that may inspire others to make changes and modifications still within the spirit and scope of the invention. The above detailed description, therefore, is not to be taken in a limiting sense, and the scope of the present invention is defined by the appended claims.

What is claimed is:

1. A transformer comprising:

a primary winding having terminals for conveying input power;

a plurality of secondary windings having output terminals for conveying output power, said secondary windings including a first pair of isolated center tapped windings and a second pair of isolated windings;

a plurality of switches electrically coupling leads of said plurality of secondary windings providing a selection of n distinct output voltages at said output terminals ranging from x voltage units to y voltage units, wherein y is greater than 2x.

2. The transformer of claim 1, wherein incremental steps of said n distinct output voltages are equal.

3. The transformer of claim 1, wherein said plurality of switches includes a pair of ganged five-position bridging tap changers, wired as a three-position series-parallel-series switch interconnecting said first pair of isolated center tapped windings.

4. The transformer of claim 3, wherein said plurality of switches further includes a three-position bridging tap changer interconnecting said second pair of isolated windings.

5. The transformer of claim 4, wherein n is equal to 9, x is equal to 6, and y is equal to 14.

6. The transformer of claim 3, wherein each winding of said second pair of isolated windings is center tapped and interconnected via a five-position bridging tap changer.

7. The transformer of claim 6, wherein n is equal to 15, x is equal to 10, and y is equal to 24.

8. The transformer of claim 3, wherein each winding of said second pair of isolated windings is divided into thirds by two winding taps dividing said windings and wherein said second pair of windings is interconnected via a seven-position bridging tap changer.

9. The transformer of claim 8, wherein n is equal to 21, x is equal to 14, and y is equal to 34.

10. The transformer of claim 1, wherein a fixed connection between an end lead of one winding of said first pair and an end lead of one winding of said second pair is provided via an external coil connection.

11. The transformer of claim 1, wherein a fixed connection between an end of one winding of said first pair and an end of one winding of said second pair is provided via an internal coil connection.

12. The transformer of claim 1, wherein a ratio of maximum secondary winding loss to minimum secondary winding loss is less than 1.35.

13. A transformer comprising:

a primary winding having terminals for conveying input power;

a plurality of secondary windings having output terminals for conveying output power, said secondary windings including a first pair of isolated windings tapped at thirds and a second pair of isolated windings;

a plurality of switches electrically coupling leads of said plurality of secondary windings providing a selection of n distinct output voltages at said output terminals ranging from x voltage units to y voltage units, wherein y is greater than 2x.

14. The transformer of claim 13, wherein the incremental steps of said n distinct output voltages are equal.

15. The transformer of claim 13, wherein leads of said first pair of isolated windings are interconnected via a pair of ganged seven-position bridging tap changers connected as four-position series-parallel-series switches.

16. The transformer of claim 13, wherein leads of said second pair of isolated secondary windings are interconnected to a three-position bridging tap changer.

17. The transformer of claim 13, wherein:

each of said second pair of isolated windings is center tapped with leads interconnected via a five-position tap changer; and each of said second pair comprises k turns each divided into two groups of m turns, and each of said first pair comprises p turns each divided into three groups of q turns where k is equal to 2m, q is equal to 2k+m, and p is equal to 3q.

18. The transformer of claim 17, wherein n is equal to 20, x is equal to 15, and y is equal to 34.

19. The transformer of claim 13, wherein:

each of said second pair of isolated secondary windings is tapped at thirds with leads interconnected via a seven-position bridging switch; and each of said second pair comprises k turns each divided into three groups of m turns and each of said first pair comprises p turns each divided into three groups of q turns where k is equal to 3m, q is equal to 2k+m, and p is equal to 3q.

20. The transformer of claim 19, wherein n is equal to 28, x is equal to 21, and y is equal to 48.

21. The transformer of claim 13, wherein a fixed connection between an end lead of one winding of said first pair and an end lead of one winding of said second pair is provided via an external coil connection.

22. The transformer of claim 13, wherein a fixed connection between an end of one winding of said first pair and an end of one winding of said second pair is provided via an internal coil connection.

23. The transformer of claim 13, wherein a ratio of maximum secondary winding loss to minimum secondary winding loss is less than 1.29.

24. A method for providing incrementally selectable electrical power outputs from a transformer, said method comprising:

providing a primary winding and a plurality of secondary windings including a first set of secondary windings and a second set of secondary windings;

providing at least a first switch and a second switch for interconnecting leads of said plurality of secondary windings, said first switch being independently operable and comprising a ganged pair of bridging tap-changers and said second switch comprising a single bridging tap-changer;

creating a plurality of sub-windings by electrically connecting taps to selected points on said secondary windings to stationary terminals of said first and second switch; and connecting end leads of said secondary windings and tap leads of said sub-windings with said first and second switch such that said secondary windings and associated sub-windings are configurable in parallel, series, and series-parallel combinations that provide n distinct output voltages ranging from x voltage units to y voltage units, wherein y is greater than 2x.

25. The method of claim 24, wherein said connecting step further comprises:

interconnecting said first set of secondary windings utilizing said first switch, wherein one switch position of said first switch connects said first set of windings in parallel; another switch position connects said first set of windings in series and all other positions of said first switch connects only portions of said first set of windings in parallel and connects a remainder of said first set of windings in series.

26. The method of claim 24, wherein said connecting step further comprises:

interconnecting said second set of secondary windings utilizing said second switch, wherein one switch position of said second switch fully bypasses said second set of windings; another switch position fully series connects said second set of windings, and all other switch positions of said second switch connects only a portion of said second set of windings in series and bypasses a remainder of said second set of windings.

27. The method of claim 24, further comprising providing a three-position bridging tap changer as said second switch.

28. The method of claim 24, wherein said creating a plurality of sub-windings is accomplished by center-tapping each of said second set of secondary windings, said method further comprising providing a five position bridging tap changer as said second switch.

29. The method of claim 24, wherein said creating a plurality of sub-windings is accomplished by tapping each of said second set of secondary windings at thirds, said method further comprising providing a seven position bridging tap changer as said second switch.

30. A transformer comprising:

a primary winding;

a plurality of secondary windings having a plurality of sub-windings created by taps at selected points on selected ones of said plurality of secondary windings;

a first switch and a second switch having terminals that connect end leads of said secondary windings and tap leads of said sub-windings, said first switch being independently operable and comprising a ganged pair of bridging tap-changers, and said second switch comprising a single bridging tap-changer, wherein said secondary windings and associated sub-windings are configurable in parallel, series and series-parallel-series combinations to yield n distinct voltage outputs ranging from x voltage units to y voltage units, wherein y is greater than 2x, and wherein a substantially low maximum to minimum winding loss is achieved.

31. The transformer of claim 30, wherein said first switch is interconnected between corresponding windings of a first set of secondary windings, wherein at least one switch position of said first switch connects said corresponding windings in parallel, at least one other switch position connects said corresponding windings in series, and other positions of said first switch connect only a portion of said corresponding windings in parallel and connect a remainder of said corresponding windings in series.

32. The transformer of claim 30, wherein said second switch is interconnected between corresponding windings of a second set of secondary windings, wherein one switch position of said second switch fully bypasses said corresponding windings; another switch position fully connects in series said corresponding windings, and all other switch positions of said second switch connects in series only a portion of said corresponding windings and bypasses the remainder of said corresponding windings.

33. The transformer of claim 30, wherein said second switch comprises a three position bridging tap changer.

34. The transformer of claim 30, wherein said second switch comprises a five position bridging tap changer.

35. The transformer of claim 30, wherein said second switch comprises a seven position bridging tap changer.

* * * * *